US005477764A

United States Patent [19]

Carrico

[11] Patent Number: 5,477,764

[45] Date of Patent: Dec. 26, 1995

[54] QUICK ATTACHMENT MECHANISM FOR GUITAR STRINGS

[76] Inventor: Eugene N. Carrico, 1308 Lawndale, Niles, Mich. 49120

[21] Appl. No.: 267,826

[22] Filed: Jun. 28, 1994

Related U.S. Application Data

[63] Continuation-in-part of Ser. No. 86,545, Jul. 1, 1993, abandoned.

[51] Int. Cl.$^6$ .......... G01D 3/00

[52] U.S. Cl. .......... 84/297 R

[58] Field of Search .......... 84/297 R

[56] References Cited

U.S. PATENT DOCUMENTS

| | | | |
|---|---|---|---|
| 572,677 | 12/1896 | Goodwin | 84/297 R |
| 674,618 | 5/1901 | Shaeffer | 84/297 R |
| 4,197,779 | 4/1980 | Holman | 84/298 |
| 4,589,321 | 5/1986 | Pritchard | 84/297 R X |
| 4,735,124 | 4/1988 | Bernier | 84/297 R X |
| 4,807,508 | 2/1989 | Yairi | 84/297 R |

*Primary Examiner*—Michael L. Gellner
*Assistant Examiner*—Patrick J. Stanzione
*Attorney, Agent, or Firm*—Paul A. Coletti

[57] ABSTRACT

The invention described herein is a attachment mechanism for attaching a string to a musical instrument. The mechanism is composed of two quick attachment cylinders. One cylinder fits matedly within the other cylinder. The first cylinder contains an outer diameter which has a frictional means to engage the bridge of the guitar. It also has a hollow center portion to matedly accept the second cylinder, as well as, of course, the guitar string. The second cylinder similarly has a hollow cylindrical center which accepts the guitar string. The second cylinder also has an external dimension so that it fits easily within the first hollow central portion of the first cylinder. The second cylinder contains a detent, such as a knob or notch, which locks on the first cylinder. An alternate, one piece form is also described.

20 Claims, 2 Drawing Sheets

QUICK ATTACHMENT MECHANISM FOR GUITAR STRINGS

RELATED APPLICATION

This application is a continuation-in-part of Ser. No. 08/086,545 filed Jul.1, 1993, entitled "Quick Attachment Mechanism for Guitar Strings", now abandoned.

FIELD OF THE INVENTION

Generally, this invention relates to musical instruments. More specifically, this invention relates to a mechanism for attaching strings to musical instruments. Most specifically, this invention relates to attaching guitar strings quickly and securedly to a guitar.

BACKGROUND OF THE INVENTION

Guitars have been popular musical instruments since the middle ages. They are quite versatile, and come with all different sorts of capabilities, such as electrical guitars, acoustical guitars, base guitars, etc. Yet, in all guitar instruments, the guitar securing and changing device is the same. That is, at the base of the guitar (just over the acoustical opening, for instance) there is contained a bar-like device, commonly referred to as the bridge which contains a number of openings capable of receiving guitar strings. For instance, in an acoustical guitar, there are commonly contained on the bridge six openings to accommodate six strings. In order to attach the guitar string, the user must knot the string before insertion into the bridge, and then thread the string through the bridge. This, of course, can be quite a cumbersome procedure, especially the knotting step. That is, for many people it is difficult to manufacture a knot in the correct position along the string so that enough of the string remains in order for it to be attached at the top of the instrument near the threads. Also, of course, if the string snaps, and a lesser length of string is available for the user, there may not be enough length of string remaining for the string to be knotted and then securedly attached. In any event, it has proven desirable to avoid the knotting and threading procedures common to all forms of guitars.

SUMMARY OF THE INVENTION

Therefore, it is an object of the invention to create an easy attachment mechanism for attaching string to a musical instrument. Specifically, this invention should relate to guitar strings. However, it is easy to imagine that this invention can apply to any musical instrument wherein the attachment procedure is like that of a guitar. For instance, this invention can relate very capably to fiddles, banjos, violins, pianos, and any other stringed instruments.

The invention described herein is a attachment mechanism for attaching a string to a musical instrument. The mechanism is comprised of two quick attachment cylinders. One cylinder fits matedly within the other cylinder. The first cylinder contains an outer diameter which has a frictional means to engage the bridge of the guitar. It also has a hollow center portion to matedly accept the second cylinder, as well as, of course, the guitar string. The second cylinder similarly has a hollow cylindrical center which accepts the guitar string. The second cylinder also has an external dimension so that it fits easily within the first hollow central portion of the first cylinder. The second cylinder contains a detent, such as a knob or notch, which locks on the first cylinder.

When the second cylinder is inserted within the first cylinder on the guitar, the string locks frictionally in place between the first and second cylinders. In this fashion, the string is capably accepted in the guitar, and yet has not had to be "sized" or knotted in order to be placed onto the guitar. Also, of course, because this is such an easy to attach mechanism, if desired the user can quickly remove the pair of cylinders detach the guitar string, lengthen or shorten the length of the guitar string within the attachment mechanism and return the guitar string all in one very brief step. This both enhances and enables fluidity of motion.

In an alternate embodiment of this mechanism, the device consists of a single cylinder. The cylinder contains a through slot which allows for insertion of the guitar string. Upon attachment of the string through the slot, the cylinder is hollowed out to allow the guitar string to be locked by a ball located on the end of the string and thereby anchored to the cylinder. The device with the string attached has an external dimension so that it fits easily within the bridge of the guitar and thereafter, the cylinder may be rotated slightly to adequately trim the length of the guitar string, and thereby adequately both attach the guitar string and tune the instrument in one step.

This invention will be better understood when the Detailed Description of the Invention is taken in conjunction with the attached drawings.

DETAILED DESCRIPTION OF THE DRAWINGS

DESCRIPTION OF THE INVENTION

Figure 1:
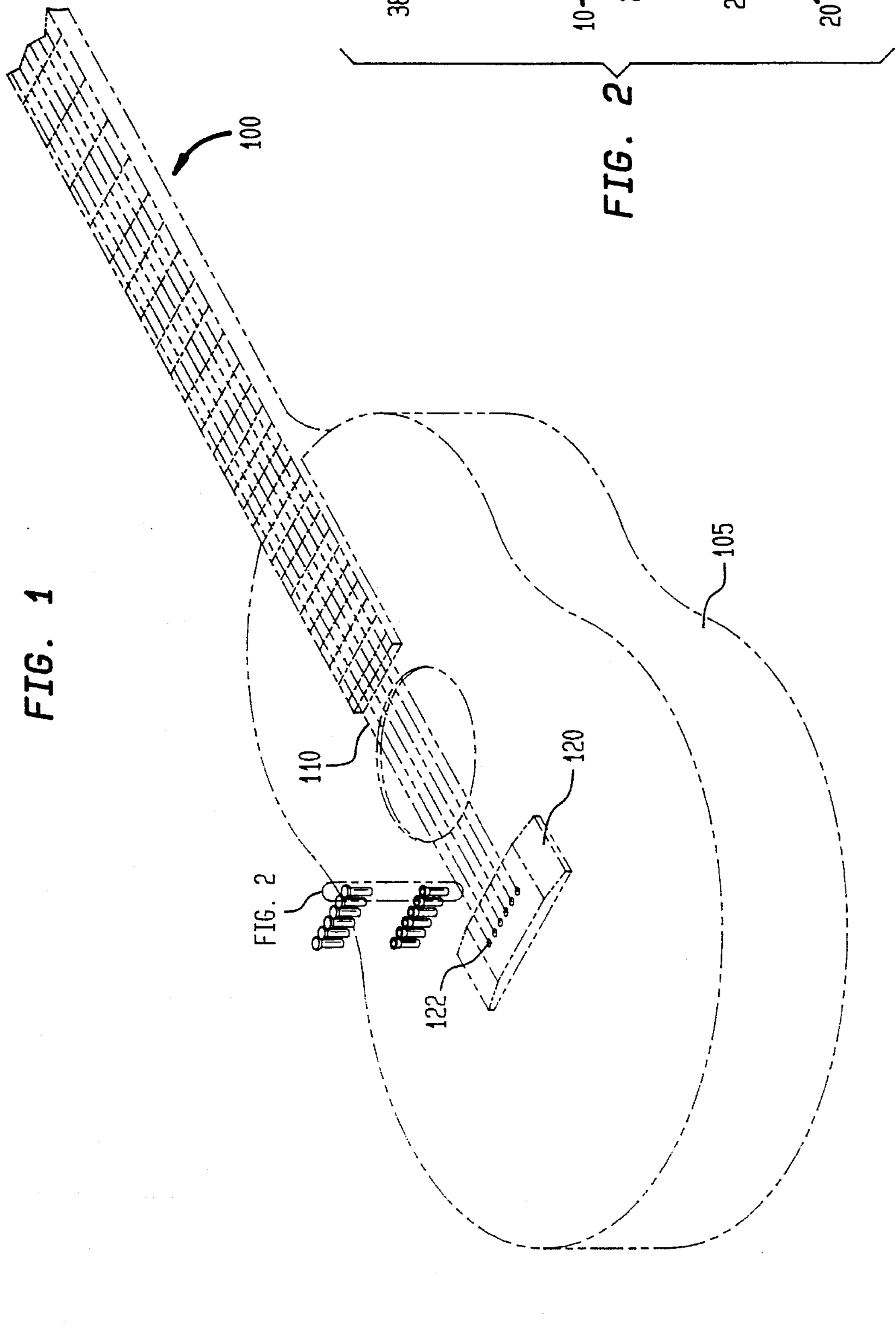
FIG. 1 is a perspective view of a guitar showing the guitar attachment mechanism attached schematically.

As seen in FIGS. 1–6, there is contained an easy attachment mechanism 10 for attachment to a guitar 100. The guitar 100 is shown in FIG. 1 and contains a series of strings 110, generally for an acoustical guitar six strings 110 in all. At the base 105 of the guitar 100 there is contained a bridge 120 for insertment of the guitar strings 100. This bridge 120 contains a number of cylindrical openings 122 which will matedly accept the present invention.

Figure 2:
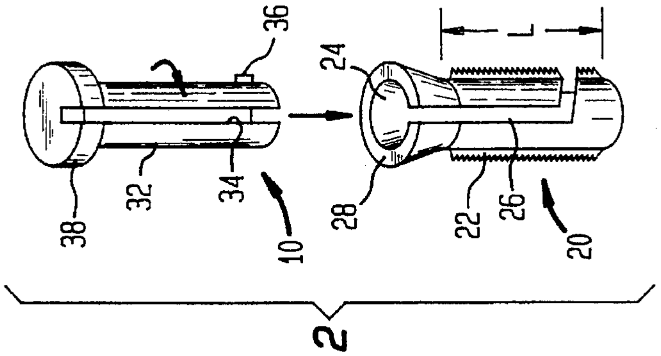
FIG. 2 is a perspective view of the guitar attachment mechanism separated from the guitar.
Figure 5:
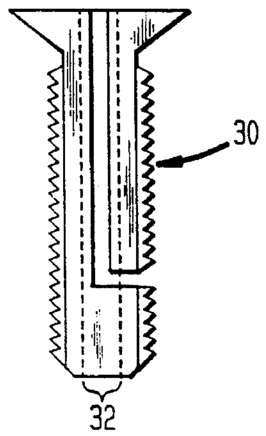
FIG. 5 is a side view of the first cylindrical portion.
Figure 6:
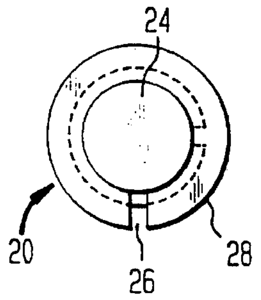
FIG. 6 is a bottom view of the second cylindrical portion.

The guitar strings 110 are generally placed through the openings 122. Then, the guitar strings are placed within the present invention. There is shown in FIGS. 2–6 various views of the invention, and how it is capable of matingly accepting and frictionally holding guitar strings. As seen in FIGS. 2, 5 and 6 there is contained a first cylindrical portion 20. This cylindrical portion 20 has a frictionally engaging outer surface 22 which engages the cylindrical openings 122 in the bridge 120 of the guitar. Also, the first cylindrical portion 20 has an cylindrical opening 24 which is capable of accepting the second cylindrical portion 30, as will later be explained. Furthermore, of course, a guitar string 110 can be placed through the cylindrical opening 24 of the first cylindrical portion 20.

The first cylindrical portion 20 similarly contains on its outer surface a cylindrical slot 26 which runs for about two-thirds of the length L of the first cylindrical portion 20. The slot 26 then contains a 90° turn so that the second cylindrical portion 30 may be locked thereon. In order to understand the utility of this invention, it would be helpful to understand dimensions of these devices. For instance the size of a typical first cylindrical opening 24 are roughly 0.50' in length, with a width of about 0.35' and a slot 26 width of about 0.060', extending about two-thirds the length of opening 24.

Figure 3:
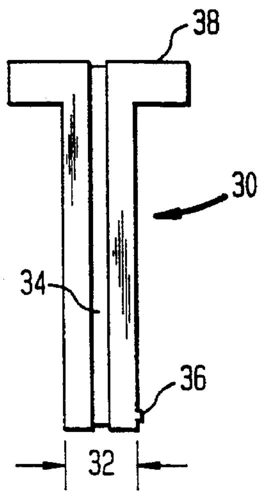
FIG. 3 is an elevation view of the second cylindrical portion.
Figure 4:
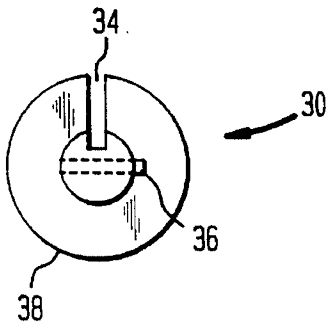
FIG. 4 is a bottom view of the second cylindrical portion.

As seen in FIGS. 2, 3 and 4 the second cylindrical portion 30 will be matedly accepted in the first cylindrical portion 20. Second cylindrical portion 30 contains a long cylinder 32 of about 0.45'–0.50' in length and with a slot 34 extending all the way therethrough. There is contained at the base of the second cylindrical portion a pin 36 which forms the locking mechanism of this device. Furthermore, the second cylindrical portion contains a flanged top 38 which helps create the locking mechanism of this string changing device.

As further seen in FIGS. 2, 5 and 6, the first cylindrical portion 20 has a flanged top 28 which also serves as a locking mechanism in this device. This flanged top 28 is roughly the size of the flanged portion 38 of the second cylindrical portion 30, so that the strings 110 will be engaged between the first and second flanged surfaces 28, 38.

In use therefore, the user threads a guitar string 110 through the cylindrical openings 122 in the bridge 120 of the guitar 100. He then strings the guitar strings 110 through the cylindrical opening 24 in the first cylindrical portion 20 and then places the string in the slot 34 of the second cylindrical portion 30. Then, the second cylindrical portion 30 is inserted with the pin 36 into the slot 26 of the first cylindrical portion 20. The cylindrical members 20, 30 are further engaged so that the pin 36 of second cylindrical portion 30 is fitted within the slot 26 and then turned 90°, so that pin 36 is locked within the first cylindrical portion 20. String 110 has been moved so that it now is held frictionally between the flanged surface 28 of the first cylindrical portion 20 and the flanged surface 38 of the second cylindrical portion 30 and engaged in a frictional fit therein. The entire assembled member is then inserted frictionally into the cylindrical opening 122 of the bridge 120 mechanism. Cylinder 22 thus frictionally engages opening 122.

Thus, the string 10 has rather quickly and capably been locked in place without knotting. Of course, the user is able to readily remove the string 110 by merely separating the cylindrical portion members 20, 30. Or, as well, the user can merely pull the string 110 so that it falls into the aligned slots 26, 36 of the first and second cylindrical portions 20, 30 and thereafter remove the string 110 through the openings of the slots 26, 36. Naturally, this relationship will also be true for subsequent removals and changes of string.

Figure 7:
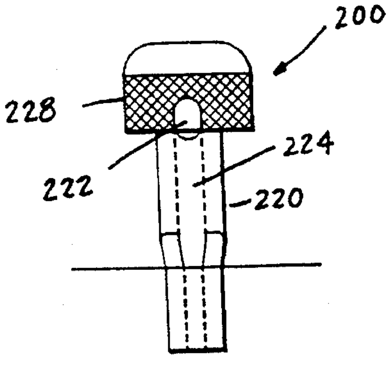
FIG. 7 is a side view of an alternate embodiment of the present invention.
Figure 8:
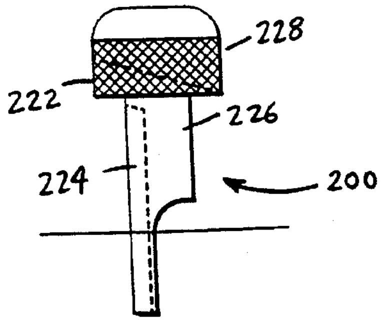
FIG. 8 is the embodiment contained in FIG. 7 rotated at 90° with respect to the longitudinal axis of the device.

FIGS. 7 and 8 describe an alternate embodiment of this device 200. This embodiment contains a cylinder 220 which contains a through slot 222. The cylinder has a hollowed out section 224 which may be placed within the cylindrical opening 122 of the bridge 120 of a guitar. The cylinder 222 is adapted at its upper portion 226 to frictionally engage the opening 122. The cylinder 220 ends at a nub 228 which is adapted to be firmly gripped by the user.

In practice therefore, the user takes a guitar string 110 and threads it through a through slot 224 in cylinder 222, so that ball 225 contacts the end of slot 224. Or, the user alternately wraps the guitar string 110 around hollowed out section 226. In this fashion, the guitar string 110 and cylinder 220 are placed within cylindrical opening 122 of bridge 120. Thereafter, the cylinder 220 is able to frictionally engage cylinder 122 at the full cylindrical section 226. However, if the user so desires, he may grasp the nub 228 and thereby slightly rotate the cylinder 220 so that the guitar string 110 may be pulled more tautly within the bridge 120. Again, however, the guitar string is easy to attach to the bridge, and therefore the objects of the invention are met by this embodiment.

Therefore, it is to be realized that what has been created is a quick and easy to use string changing system which avoids the cumbersome problem of knotting and accurately dimensioning guitar strings or strings used in any other musical instruments. Of course, the invention described herein is to be understood from the attached claims and their equivalents.

I claim:

1. For use in attaching a string to a musical instrument, an attachment mechanism comprising:

a gripping mechanism to grip said string and engage said string therein in frictional relationship, wherein said gripping mechanism comprises at least a slot placed in said gripping mechanism for said string to be threaded therein, said attachment mechanism further containing at least a full cylindrical opening within a portion of said gripping mechanism to place said string therethrough.

2. A mechanism for attaching a string to a musical instrument comprising:

first engagement means capable of accepting said string therein, and said first engagement means capable of being releasably attached to said instrument;

second engagement means capable of accepting said string therein, and said second engagement means associated with said first engagement means so as to capture said string in frictional relationship between said first engagement means and said second engagement means, said second engagement means containing a cylindrical opening therein, said string capable of being threaded within said cylindrical opening so that said string is captured between said first engagement means and said second engagement means.

3. The mechanism of claim 2 wherein said first engagement means is a cylinder, said cylinder capable of being inserted into a cylindrical opening on said musical instrument in a frictional relationship therewith.

4. The mechanism of claim 3 wherein said first engagement means contains a cylindrical opening therein, said cylindrical opening capable of accepting said second engagement means.

5. The mechanism of claim 4 wherein said second engagement means is cylindrical and contains a cylindrical open center therein for accepting said string.

6. The mechanism of claim 5 wherein said first and second engagement means are lockable one within the other upon capture of said string within said first and second engagement means.

7. The mechanism of claim 2 wherein said musical instrument is a guitar.

8. In combination:

a) a device for releasable attachment to a musical instrument, comprising:

a first generally cylindrical chamber for accepting a musical instrument string, said string insertable into a hollow opening in said chamber; and a second generally cylindrical chamber attached to a said first chamber, said second chamber having a cylindrical opening therein for accepting said string;

and b) a musical instrument containing at least one cylindrical opening therein, wherein said first chamber is insertable into said cylindrical opening.

9. The combination of claim 8 wherein said instrument is a guitar.

10. The combination of claim 8 wherein said first chamber is frictionally engaged in said cylindrical opening.

11. The combination of claim 8 wherein said second chamber can rotate within said first chamber so as to lock within said first chamber.

12. The combination of claim 8 wherein said string is insertable through the interior of said first chamber.

13. The combination of claim 12 wherein said string is insertable through the interior of said cylindrical opening.

14. The combination of claim 13 wherein said string contains a ball at its end, said ball contacting said cylindrical opening.

15. The combination of claim 14 wherein said string contains a ball at its end, said ball contacting said cylindrical opening.

16. The combination of claim 8 wherein said first chamber has a first flange thereon, and said second chamber has a second flange with a diameter at least as large as said first flange, and said string is capable of locking between said first and second flanges.

17. In combination:

(a) a device for releasable attachment to a musical instrument comprising a generally cylindrical chamber for accepting a musical instrument string, said string insertable into a hollow cylindrical opening in said chamber;

(b) said generally cylindrical chamber contained on a cylindrical member surrounding said chamber, said cylindrical member having at least a portion of which will frictionally engage an opening on said musical instrument; and (c) a musical instrument containing at least one cylindrical opening therein, wherein said cylindrical member is insertable into said cylindrical opening.

18. The combination of claim 17 wherein said instrument is a guitar.

19. In combination:

(a) a device for releasable attachment to a musical instrument comprising a generally cylindrical chamber for accepting a musical instrument string, said string insertable into a hollow cylindrical opening in said chamber;

(b) said generally cylindrical chamber contained on a cylindrical member surrounding said chamber, said cylindrical member having at least a portion of which will frictionally engage an opening on said musical instrument; and (c) a musical instrument containing at least one cylindrical opening therein, wherein said cylindrical member is insertable into said cylindrical opening;

wherein said generally cylindrical chamber contains two portions comprising a first portion having a longitudinal axis parallel to said cylindrical member, and said second portions are continuous to form a continuous opening within said cylindrical member.

20. In combination:

(a) a device for attachment to a musical instrument comprising a cylindrical chamber for accepting a musical instrument string, said string insertable into a hollow cylindrical opening in said chamber;

(b) said cylindrical chamber contained on a generally cylindrical member surrounding said chamber, said cylindrical member having at least a portion of which will frictionally engage an opening on said musical instrument;

(c) a musical instrument containing at least one cylindrical opening therein, wherein said cylindrical member is insertable into said cylindrical opening; and wherein said generally cylindrical member can rotate within said cylindrical opening so as to rotate said instrument string within said cylindrical opening.

* * * * *